No. 631,668. Patented Aug. 22, 1899.
J. W. PRIDMORE.
FRAME FOR APRONS OF GRAIN HARVESTERS.
(Application filed Jan. 24, 1898.)
(No Model.)
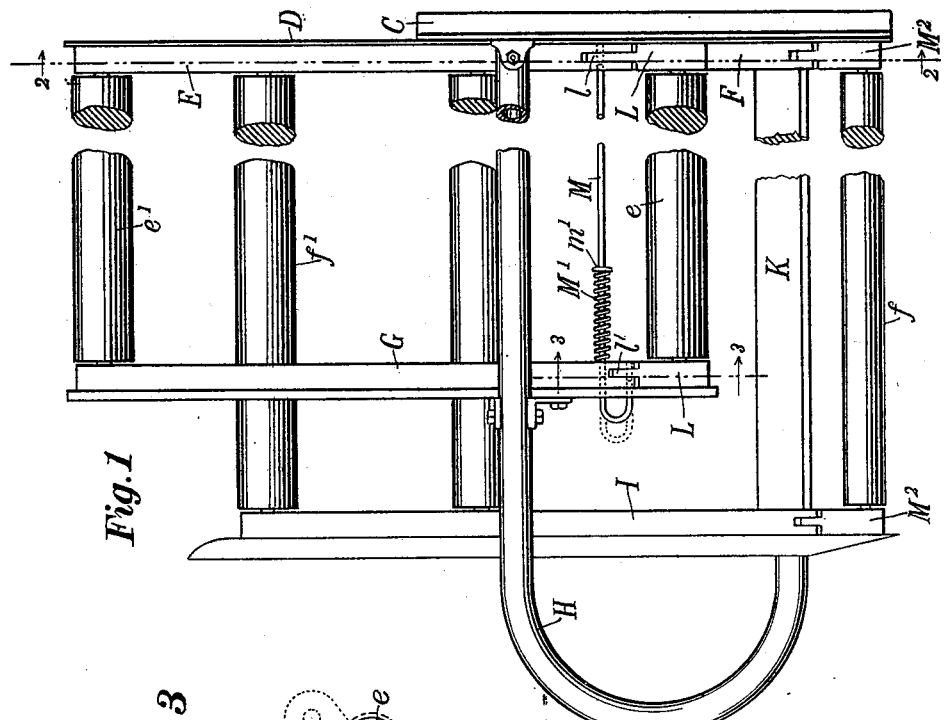
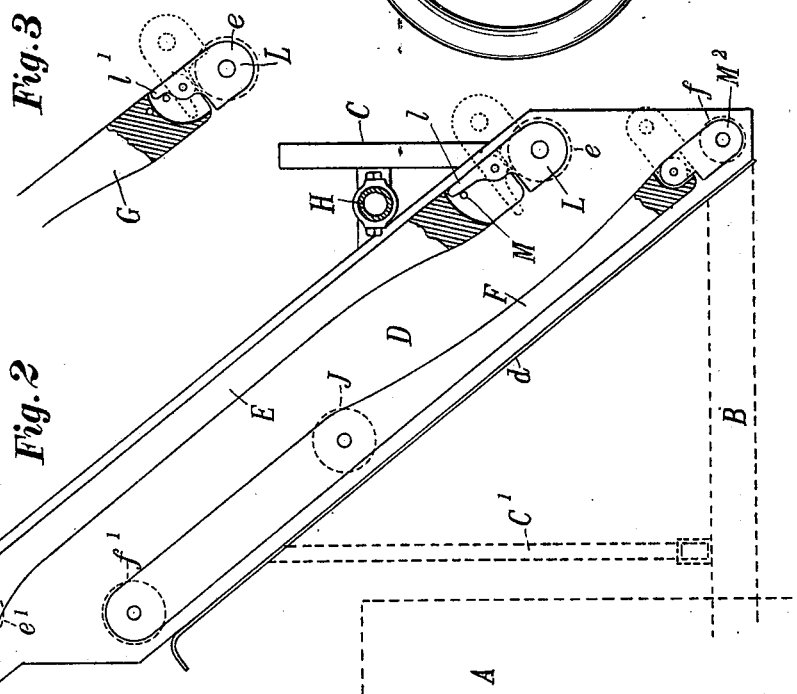
WITNESSES:
John M. Culver
Lewis H. Williams
INVENTOR
John W. Pridmore
BY
R. B. Swift
ATTORNEY.

UNITED STATES PATENT OFFICE.

JOHN W. PRIDMORE, OF CHICAGO, ILLINOIS, ASSIGNOR TO THE McCORMICK HARVESTING MACHINE COMPANY.

FRAME FOR APRONS OF GRAIN-HARVESTERS.

SPECIFICATION forming part of Letters Patent No. 631,668, dated August 22, 1899.

Application filed January 24, 1898. Serial No. 667,778. (No model.)

*To all whom it may concern:*

Be it known that I, JOHN W. PRIDMORE, a citizen of the United States, residing at Chicago, in the county of Cook and State of Illinois, have invented a new and useful Improvement in the Frames that Carry the Endless Aprons on Self-Binding Harvesters, of which the following is a specification.

My invention relates to improvements in self-binding harvesters in which the grain is carried from the platform where it is cut on endless aprons to the binding mechanism; and the objects of my improvement are, first, to provide facilities so that the aprons can be more easily put on the machine; second, to provide facilities so that the operator can expeditiously relieve the strain on the aprons when the machine is not in use and when it is standing in damp places, and, third, in the arrangement of the devices to accomplish the above objects. I attain these objects by the mechanism illustrated in the accompanying drawings, in which—

Figure 1 is an elevation, looking from the grain side of the machine, of so much of the framework of the elevator of a self-binding harvester as is necessary to show my invention, the elevator being longitudinally broken, so as to bring it nearer together, and thus take less space on the drawing. Fig. 2 is an elevation looking from the rear on line 2 2 of Fig. 1, and Fig. 3 is a detailed drawing on line 3 3 of Fig. 1.

Similar letters refer to similar parts throughout the several views.

The main wheel A of the machine is represented in dotted lines in Fig. 2, as is also the main sill B. The grain-wheel and platform, which are the same as found on all self-binding grain-harvesters, are not shown.

At the delivery end of the platform is erected a framework that is supported at its front side by the posts C and C', which are erected from the main sills B of the machine. The post C' is shown in dotted lines. To these posts a wide side-board D is attached, the lower edge of which, *d*, is bent at right angles to the main body, thus forming a support to prevent the under ply of the lower apron from sagging. To this front side-board are attached two roller-guides. The upper one, E, serves as a support for the rollers *e* and *e'*, while the lower one, F, serves as a support at the front end for the rollers *f* and *f'*.

The elevator shown in the drawings is of a type known as "open at the rear" and is common in such constructions.

The framework for the upper apron is not as wide as that of the lower, while room is left for long grain to project to the rear. In order to accomplish this, the rear roller-guide G for the upper apron is supported by a long yoke H, that extends from the post C at the front of the machine rearwardly over the top of the framework for the upper elevator and beyond the machine, finally curving and being attached to the sill of the machine beneath the framework of the lower elevator.

The roller-guide G serves to support the rear end of the rollers *e* and *e'*. The rear end of the rollers *f f'* are supported on a roller-guide I, that is attached to the rear elevator side-board, which is supported from the main frame of the machine in a manner similar to that of the front side-board D. In the drawings a third roller J is shown that is supported by the guides F and I. It is, however, not necessary to my invention, but is shown merely because it is sometimes found in the elevators of harvesters as now built. The flat bar K is merely a still extending from the front of the elevator to the rear.

In practice it has been found that self-binding harvesters are shipped to all sections of the country where grain is grown and that they are frequently stored in damp places or not stored at all, so that the aprons become damp and contract. This shortening of the apron makes it very difficult to make the ends come together. If made longer, the apron will when dry stretch so that it will be too long. It has been common for years to provide the machines with different forms of devices for buckling the aprons, and even with these it has been sometimes almost impossible to put the aprons upon the machine. One object of my invention is to so build the machine that the end rollers can be thrown together while the apron is being put on, and then the roller can be thrown back into its proper position. I accomplish this result by placing one of the rollers for each apron in pivoted boxes which are extended from the ends of the roller-guides. In the drawings I have shown the lower rollers of each of the aprons so pivoted, and in practice it has been found more convenient to pivot these rollers rather than the upper ones. The lower roller of the upper apron is supported in boxes L, that are pivoted to the lower ends of the guides E and G. It is plain that when these pivoted boxes are turned up the distance between the two rollers will be shortened, and that a contracted apron can in this way be buckled or fastened by any means that are provided, and that when so done the roller can be pressed back into position. It has been found in practice that this can be done easily by hand without much exertion. While the pivot of the boxes L is above that of the center of the roller, so that the strain of the apron naturally holds the roller in position, still the grain would were the boxes not held in place sometimes raise the roller and thus loosen the apron. A convenient form of a lock for holding these boxes in place is formed by the hooked rod M, which extends across the frame of the upper apron and enters the guide at front beneath an extension $l$ of the box L and at the rear is curved so as to form a convenient handle for drawing the rod, and the curved portion also making the lock under the extension $l'$ of the box L in the rear. A spring $M'$ on the rod, which is held in place by the washer $m'$, tends to keep the rod in place and acting as a lock. The lower roller of the lower apron is also mounted in pivoted boxes $M^2$, which are pivoted in the roller-guides F and I. The pivot of these boxes to the guides is above the center of the roller when the roller is thrown into its lower position, and the grain being delivered on top of the roller there is no tendency for the roller to rise as the machine is operated, and it is therefore not necessary to provide a lock as in the case of the upper roller.

In the operation of self-binding harvesters in the field when it comes night it is a common practice for the drivers to cover the aprons of the machine with bundles or with pieces of canvas to keep the dew from the aprons. When the aprons become damp, they immediately shrink, thus placing the fabric under great strain and in many instances tearing the buckles and other fastening devices. All that it is necessary to do to prevent this with my improved construction is to throw up the rollers. The aprons can in this way contract, and when ready to start the machine in the morning, if the aprons have not already dried out, it will be very easy to loosen the buckles or other fastenings of the apron, so that they will not be necessarily stretched, after which the rollers can be pushed down to their working positions. Attention should be called to the fact that when aprons are left upon the machine at night in bad weather they become so stretched that it is almost impossible to loosen them with the ordinary means, and the machine is therefore started to work with the aprons under a high tension, which not only very materially increases draft, but as the aprons dry they remain stretched and soon they are spoiled. The aprons are one of the first parts of a self-binding harvester to be worn out, and they are the most costly part of the machine to replace.

Having described my invention, what I desire to secure by Letters Patent is—

1. In combination in an elevator for grain-harvesters, two endless aprons, one overlying the other mounted on rollers which are journaled in a framing on the machine, boxes pivoted to the framing in which one of the rollers at the end of each apron is journaled and means for locking the rollers in their working positions.

2. In a harvester-elevator in combination with a lower endless apron, an upper apron having one of its end rollers journaled in pivoted boxes, whereby the roller can be rocked on the pivots of the boxes and the distance between the end rollers shortened, and a locking-rod which extends from one of the pivoted boxes to the other with means for throwing the rod into and out of engagement with the boxes.

3. In a harvester, the combination of an apron-carrying frame, rollers at opposite ends of the frame, pivoted boxes in which one of said rollers is journaled, and a releasable locking device for holding said boxes in position to keep the apron taut.

4. In a harvester, the combination of an apron-carrying frame, rollers at opposite ends of the frame, pivoted boxes L in which the roller at one end of the frame is journaled, extensions $l$ projecting inwardly from said boxes, and a rod M for locking the extensions in position to hold the roller outwardly extended.

5. In a harvester, the combination of an apron-carrying frame, rollers at opposite ends of the frame, pivoted boxes L in which one of the rollers is journaled, extensions $l$ projecting inwardly from the boxes, a hooked rod M for releasably locking both the extensions in position to hold the roller outwardly extended, and a spring $M'$ to hold the rod in engagement with the extensions.

JOHN W. PRIDMORE.

Witnesses:
GEORGE C. BLACKMER,
R. B. SWIFT.